(12) United States Patent
Sharma et al.

(10) Patent No.: US 11,695,992 B2
(45) Date of Patent: Jul. 4, 2023

(54) CONTENT RECOMMENDATIONS FOR USERS WITH DISABILITIES

(71) Applicant: Rovi Guides, Inc., San Jose, CA (US)

(72) Inventors: Srishti Sharma, Bihar (IN); Rohit Dhiman, Uttarakhand (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/376,471

(22) Filed: Jul. 15, 2021

(65) Prior Publication Data
US 2023/0014995 A1    Jan. 19, 2023

(51) Int. Cl.
   *H04N 21/45*     (2011.01)
   *G06V 40/70*     (2022.01)

(52) U.S. Cl.
   CPC ......... *H04N 21/4532* (2013.01); *G06V 40/70* (2022.01)

(58) Field of Classification Search
   CPC ................. H04N 21/4532; G06V 40/70
   See application file for complete search history.

(56) References Cited

U.S. PATENT DOCUMENTS

| | | | |
|---|---|---|---|
| 2009/0133071 A1* | 5/2009 | Sakai | H04N 21/251 725/46 |
| 2014/0344839 A1* | 11/2014 | Woods | H04N 21/435 725/9 |
| 2021/0006866 A1* | 1/2021 | Chu | H04N 21/482 |

* cited by examiner

*Primary Examiner* — Chenea Davis
(74) *Attorney, Agent, or Firm* — Haley Guiliano LLP

(57) ABSTRACT

Systems and methods are provided for recommending media content to users with disabilities. In response to determining that a user has a disability, a type of the disability is determined. A media content item to recommend to the user is determined, among a plurality of media content items, based on the determined type of disability and a favorability factor of the media content item for the determined type of disability. The favorability factor of the media content item corresponds to an ability of a user with the determined type of disability to comprehend the media content item. An identifier of the determined media content item is generated for presentation.

16 Claims, 8 Drawing Sheets

300

| Media Content Item | Total Duration of Scenes (T) | Duration of Scenes with Vocal Output > Threshold (V) | Duration of Scenes Easily Capturable in Subtitles (S) | Visual Impairment Favorability Factor $F_V = V/T$ | Hearing Impairment Favorability Factor $F_H = S/T$ |
|---|---|---|---|---|---|
| Transformers | 130 Mins — 124 | 80 Mins | 120 Mins | $F_V = 62\%$ | $F_H = 92\%$ |
| GoodFellas | 140 Mins — 224 | 120 Mins | 100 Mins | $F_V = 86\%$ | $F_H = 71\%$ |
| Twelve Angry Men | 90 Mins — 225 | 85 Mins | 30 Mins | $F_V = 94\%$ | $F_H = 33\%$ |

FIG. 3

CONTENT RECOMMENDATIONS FOR USERS WITH DISABILITIES

BACKGROUND

The present disclosure is directed to systems and methods for recommending media content items to users with disabilities, and, more particularly, for recommending media content items to users with disabilities based on the type of user disability.

SUMMARY

Modern media distribution systems may provide personalized media content item recommendations to users. Many different techniques may be used to select media content items that a particular user may find interesting. For example, in one approach, media content items may be recommended based on other media content items a user has consumed, interests of the user, demographic information of the user, trending content, etc. However, in this approach, if a user has a disability (e.g., a sensory disability), the user may find it difficult to comprehend or enjoy certain media content items. For example, the ability of a disabled user to comprehend or enjoy a media content item may depend on the characteristics of the media content item and the type of disability of the user. In one example, if a user has a visual impairment, it may be difficult for the user to comprehend media content items that do not have a large amount of dialogue. Similarly, if a user has a hearing impairment, it may be difficult for the user to comprehend media content items that are not easily capturable by subtitles. Thus, users with disabilities may not enjoy many media content items that are recommended by this approach.

Accordingly, to solve one or more of these problems, systems and methods are provided for recommending media content items to a user with a disability, based on the type of disability. In particular, a content recommendation application may determine that a user has a disability. In response to determining that the user has a disability, the content recommendation application may determine a type of the disability (e.g., a type of sensory impairment). The content recommendation application may determine a media content item to recommend to the user, among a plurality of media content items, based on the type of disability and a favorability factor of the media content item for the type of disability. For example, if the user has a hearing impairment, the content recommendation application may determine a media content item with a high favorability factor for users with hearing impairments (e.g., media content that is easily capturable by subtitles), as the media content item to recommend to the user. If the user has a visual impairment, the content recommendation application may determine a media content item with a high favorability factor for users with visual impairments (e.g., a media content item with a large amount of dialogue) as the media content item to recommend to the user. The content recommendation application may generate for presentation an identifier of the determined media content item.

In some embodiments, the content recommendation application may determine that the user is in the vicinity of user equipment and, when generating for the identifier for presentation, may generate for presentation, on the user equipment, the identifier of the determined media content item.

In some embodiments, the content recommendation application, when determining the type of the disability, may determine an identity of the user; retrieve, from a database of user profiles, a profile of the user based on the identity of the user; and determine the type of disability stored in the profile of the user.

In some embodiments, the type of the disability may be a hearing impairment or a visual impairment, and the favorability factor is a hearing impairment favorability factor or a visual impairment favorability factor. In some embodiments, the content recommendation application may determine, for each of the plurality of media content items, the hearing impairment favorability factor, which corresponds to an ability of a user with a hearing impairment to comprehend the media content item, and the visual impairment favorability factor, which corresponds to an ability of a user with a visual impairment to comprehend the media content item.

In some embodiments, the content recommendation application, when determining, for each of the plurality of media content items, the hearing impairment favorability factor, may determine a ratio of a duration of scenes of the media content item easily capturable in subtitles to a total duration of scenes of the media content item. In some embodiments, the content recommendation application, when determining, for each of the plurality of media content items, the visual impairment favorability factor, may determine a ratio of a duration of scenes of the media content item with vocal outputs greater than a vocal threshold to a total duration of the media content item.

In some embodiments, the content recommendation application may determine the severity of the determined type of disability. In some embodiments, the content recommendation application, when determining the media content item to recommend to the user, may set a threshold value based on the determined severity of the determined type of disability, and select a media content item that has a favorability factor for the determined type of disability that exceeds the threshold value as the media content item to recommend to the user.

In some embodiments, the content recommendation application, when determining the media content item to recommend to the user, may select, from among the plurality of content items, a media content item having the highest favorability factor for the determined type of disability as the media content item to recommend to the user.

In some embodiments, the content recommendation application may generate for presentation, with the identifier of the determined media content item, an indication of the favorability factor of the determined media content item for the determined type of disability.

In some embodiments, the content recommendation application may receive an input from the user indicating the type of disability and the severity of the type of disability, and determine the media content item to recommend to the user based on the severity of the type of disability.

In some embodiments, the content recommendation application may determine identities of the user (e.g., a first user) and a second user in the vicinity of user equipment; retrieve, from a database of user profiles, a first profile of the first user based on the identity of the first user and a second profile of the second user based on the identity of the second user; and determine a subset of media content items of interest to the first user and second user, among the plurality of media content items, based on the first user profile and the second user profile. In some embodiments, the content recommendation application, when determining the media content item to recommend to the user, may select, from among the subset of content items, a media content item having the highest favorability factor for the determined type of disability as the media content item to recommend to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an illustrative table 300 of favorability factors for a plurality of media content items, in accordance with some embodiments of the present disclosure;

DETAILED DESCRIPTION

Figure 1:
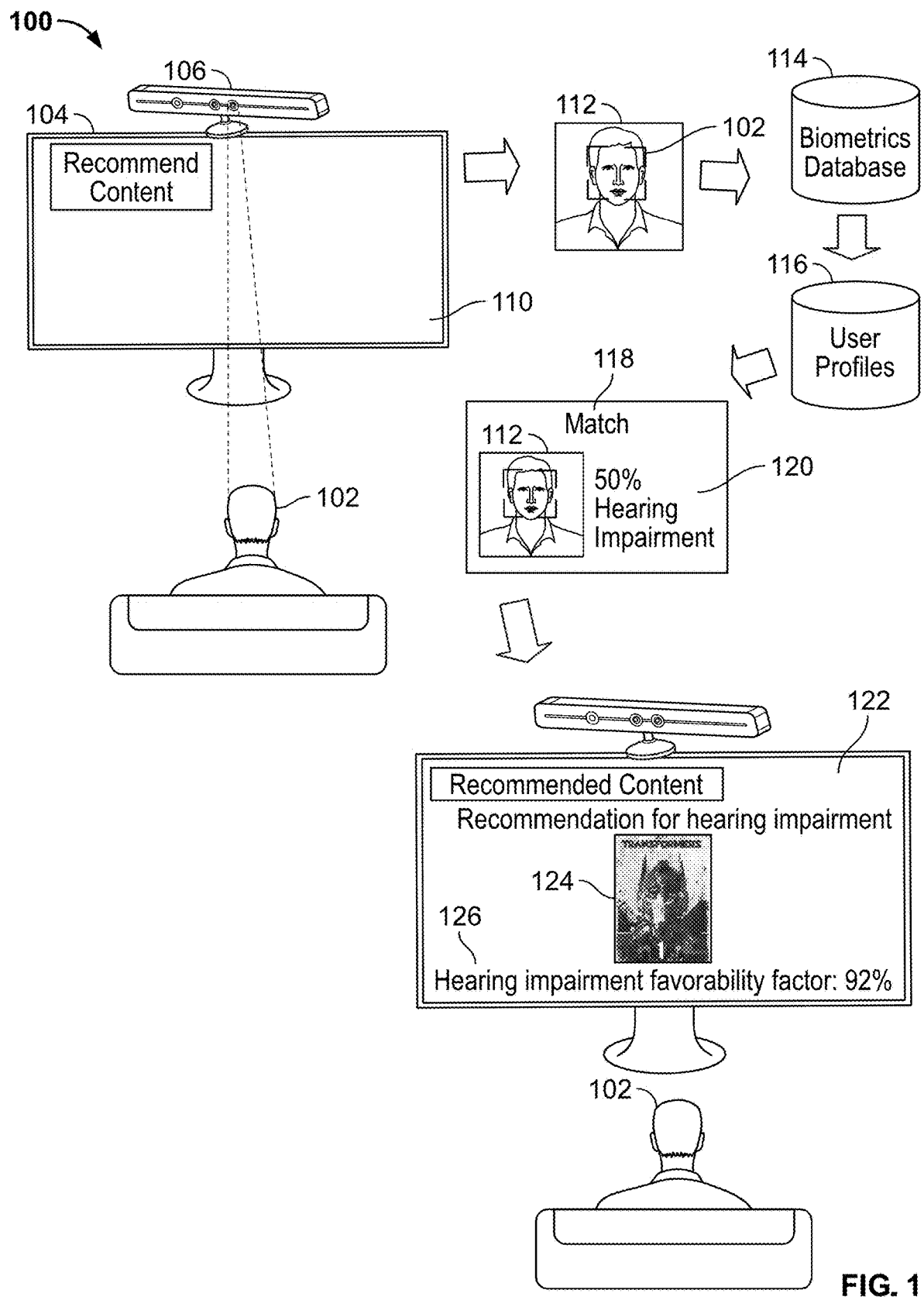
FIG. 1 shows an illustrative system 100 for identifying a user with a hearing impairment and recommending media content to the user based on the hearing impairment, in accordance with some embodiments of the present disclosure.

FIG. 1 shows an illustrative system 100 for identifying a user with a hearing impairment and recommending media content to the user based on the hearing impairment, in accordance with some embodiments of the present disclosure. The system 100 may include user equipment 104 (e.g., a television, mobile device, phone, tablet, computer, or any other suitable computing device) and a sensor 106 (e.g., a camera communicatively coupled to (or integrated with) the user equipment 104. The user equipment 104 is depicted as a television, but may be any user equipment with any functionality described below with respect to at least FIGS. 4 and 5. The user equipment 104 may comprise control circuitry (also described in further detail with respect to at least FIGS. 4 and 5), which executes a content recommendation application. The user equipment 104 may include a graphical user interface (GUI), which may include one or more GUIs 110, 122, enabling users to interact with a content recommendation application. The user equipment 104, the sensor 106, biometrics database 114, and user profiles database 116 may be communicatively coupled via a network (e.g., network 506 of FIG. 5). In some embodiments, the biometrics database 114 and user profiles database 116 may be included in any of media content source 502, server 504 and/or user equipment 508, 510 of FIG. 5.

The content recommendation application may identify users in the vicinity of the user equipment 104. For example, as shown, the user 102 may be viewing the recommend content GUI 110 provided by the content recommendation application, and the sensor 106 may capture in real time one or more images of user 102. The content recommendation application may analyze an image 112 of a face of the user 102, in order to identify facial characteristics of the user 102. For example, the content recommendation application may utilize any suitable facial recognition algorithm and/or image processing techniques to identify or extract various features (e.g., distance between eyes, distance from chin to forehead, shape of jawline, depth of eye sockets, height of cheek bones, overall arrangement of facial features, size and shape of facial features, etc.) of the face of the user 102 in the image 112.

The content recommendation application may compare the identified facial features of user 102 to facial feature information of users stored in the biometrics database 114. Based on such comparisons, the content recommendation application may determine whether there is a match between identified facial features of the user 102 and facial features of users stored in the biometrics database. In some embodiments, the content recommendation application may compute a similarity score for the comparison and may determine that there is a match if a computed similarity score exceeds a certain threshold.

In some embodiments, the content recommendation application may generate an image signature or facial signature of the user 102. For example, the facial signature may comprise a feature vector including numerical values representing the various detected facial features (e.g., a numerical value representing a distance between eyes, a numerical value representing a shape of jawline, etc.), and such feature vector may be compared to feature vectors associated with known faces of users in the biometrics database 114.

The content recommendation application may determine, based on the above comparison, that the identified facial features of image 112 match biometric data for the user 102. In response to such determinations, the content recommendation application may retrieve a user profile 118 for the user 102 from the user profiles database 116. Although facial recognition is described as the method of identifying the user 102, this is only one example, and any suitable recommendation method may be used by the content recommendation application to identify the user 102. For example, if the content platform the user 102 is accessing requires the user to log in (e.g., via the user equipment 104), the content recommendation application may determine the identity of the user 102 based on the login information. The content recommendation application may also identify the user 102 using information obtained from a device associated with the user 102 (e.g., the user equipment 104, a smartwatch, a smartphone, a hearing prosthesis, etc.). In some embodiments, the content recommendation application may identify the user 102 based on a voice of the user 102 (e.g., voice recognition). In some embodiments, if a user detected by the content recommendation application does not have a user profile, the content recommendation application may prompt the user to create a profile.

The user profile 118 may indicate, e.g., various interests of the user, viewing history of the user, prior search queries of the user, prior interactions with media assets by the user, social media interactions by the user related to media assets, etc. In addition, the user profile 118 may indicate whether the user 102 has a disability (e.g., a sensory impairment) that may affect the ability of the user 102 to enjoy certain types of content (e.g., a hearing impairment, a visual impairment, a learning disability, etc.). For example, users with a visual impairment may have a difficult time understanding content with negligible vocal content (e.g., content with many scenes having non-verbal communication, fights, emotional scenes, etc.). Similarly, users with a hearing impairment may have a difficult time understanding content that is not easily capturable in subtitles (e.g., scenes with fast dialogue, scenes with several characters speaking, scenes with a high rate of frame changes with corresponding dialogue, etc.). As shown, the user profile 118 may indicate that the user 102 has a hearing impairment 120 and a severity of the hearing impairment ("50% hearing impairment").

In some embodiments, the user 102 may enter a disability (e.g., the disability 120) into their user profile 118. For example, the content recommendation application may prompt the user 102 to submit any disabilities. In some embodiments, the content recommendation application may determine a disability of a user through a sensory impairment test. For example, the content recommendation application may administer a hearing test by playing a series of sounds through a speaker of the user equipment 104 and prompting the user to indicate if they heard each of the sounds. Based on the user response, the content recommendation application may determine if the user has a hearing impairment, and, if so, a level of the hearing impairment. Similarly, the content recommendation application may administer a vision test by displaying a series of symbols on the user equipment 104 and prompting the user to indicate if they are able to identify each of the symbols. Based on the user response, the content recommendation application may determine if the user has a visual impairment, and, if so, a level of the visual impairment. In some embodiments, when administering a hearing impairment test or visual impairment test, the content recommendation application may account for factors that may affect the test (e.g., a distance of the user from the user equipment 104, a noise level in the vicinity of the user equipment 104, etc.). In some embodiments, the content recommendation application may retrieve a medical history of the user to determine a disability of the user. In some embodiments, the content recommendation application may determine a disability of the user by monitoring the user's interactions with the user equipment 104 (e.g., by monitoring volume levels over time, subtitle settings, etc.).

In response to retrieving the user profile 118 of the user 102 and determining that the user 102 has, e.g., a "50% hearing impairment," the media content application may identify media content items to recommend to the user 102 based on the retrieved user profile 118 and the type of the disability 120 and the severity of the type of the disability 120. For example, as shown, GUI 122 may be generated for presentation to the user 102, including an identifier 124 for an identified media content item ("Transformers") with a high hearing impairment favorability factor 126 (i.e., 92%). That is, as explained in further detail in reference to FIG. 3, the content recommendation application may recommend a media content item that a user with a hearing impairment is able to comprehend. For example, because "Transformers" is a media content item with mostly fight scenes and explosions without much verbal content, the user 102 may be able to easily comprehend the media content item, despite their hearing impairment. In some embodiments, a plurality of media content items may be identified based on the user profile 118 (e.g., various interests of the user 102, viewing history of the user 102, prior search queries of the user 102, prior interactions with content media items by the user 102, social media interaction by the user 102 related to media content items, etc.), and one or more of these identified content items may be selected based on a favorability factor of each of the identified media content items for the determined disability 120 of the user 102 (e.g., the favorability factor may be used as a factor in recommending media content items). In some embodiments, the determined disability 120 may be used as a factor in selecting a media content item, along with other factors in the user profile 118. In response to the user 102 selecting the identifier 124, the corresponding media content item may be generated for presentation on the user equipment 104.

In some embodiments, when a media content item (e.g., corresponding to the selected identifier 124) is generated for presentation on the user equipment 104, the media content application may determine if any modified audio streams are available for the media content item. For example, the media content application may determine if there are any modified audio streams that are easier for a user with a hearing impairment to understand (e.g., reduced background noise, increased verbal content levels relative to other volume levels, optimized for different types of hearing prostheses such as a cochlear implant, a bone conduction device, a middle ear implant, a brain stem implant, etc.). In some embodiments, if multiple modified audio streams are available, the media content application may select the modified audio stream that best improves understanding for the particular user. For example, if the media content application determines that the user 102 has a cochlear implant and determines that a modified audio stream that is optimized for users with cochlear implants exists, the media content application may generate the media content item for presentation on the user equipment 104 with the modified audio stream. In some embodiments, if the user 102 has a wired/wireless hearing aid/headphone(s) that is able to receive and reproduce audio content (e.g., via a speaker), the media content application may transmit an audio stream directly to the hearing aid/headphone(s). In this way, if multiple users are consuming the media content item (e.g., including users without hearing impairments), the volume of the audio stream being produced by the user equipment 104 may be played at a normal level, while the user 102 may adjust the level of the audio stream in their hearing aid/headphone(s). In some embodiments, if the user 102 has a device capable of displaying subtitles (e.g., a smartphone), the media content application may display subtitles on the device so that subtitles do not need to be displayed on a main display viewed by multiple users (e.g., the user equipment 104).

Figure 2:
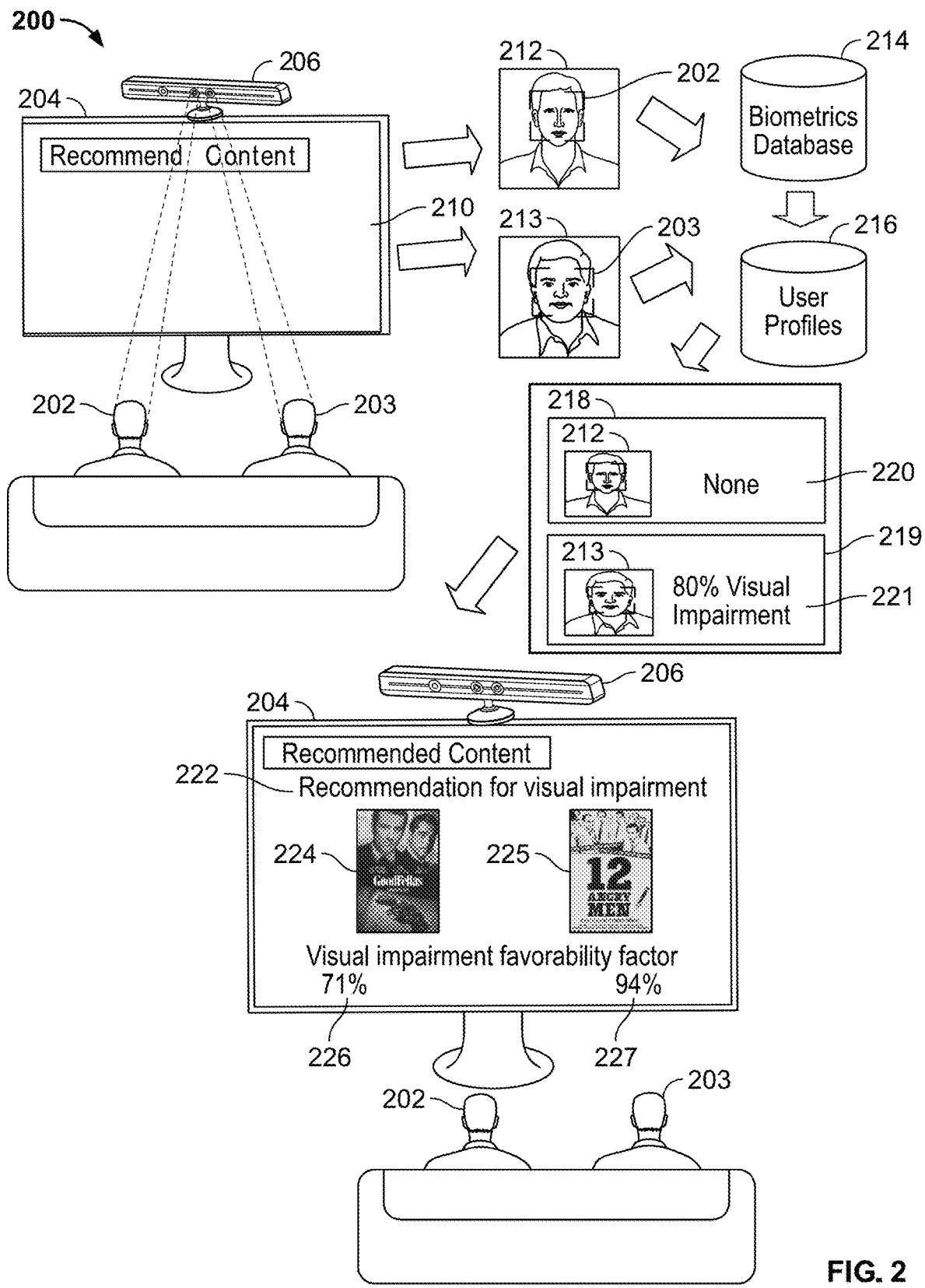
FIG. 2 shows an illustrative system 200 for identifying a user with a visual impairment and recommending media content to users based on the visual impairment, in accordance with some embodiments of the present disclosure.

FIG. 2 shows an illustrative system 200 for identifying a user with a visual impairment and recommending media content to users based on the visual impairment, in accordance with some embodiments of the present disclosure. The system 200 may include user equipment 204, a sensor 206, biometrics database 214, and user profiles database 216. The system 200 may correspond to the system 100 described above with reference to FIG. 1.

The content recommendation application may identify users in the vicinity of the user equipment 204. For example, as shown, users 202 and 203 may be viewing a recommended content GUI 210 provided by the content recommendation application, and the sensor 206 may capture in real time one or more images of the users 202 and 203. The content recommendation application may analyze images 212 and 213 of the respective faces of the users 202 and 203, in order to identify facial characteristics of the users 202 and 203, and identify the users 202 and 203 based on a comparison with features stored in the biometrics database 214, using the techniques described above with reference to FIG. 1. It should be understood that the content recommendation application may identify the users 202 and 203 using any other suitable technique (e.g., as described above with reference to FIG. 1).

The content recommendation application may retrieve, from the user profiles database 216, a user profile 218 based on the identity of the user 202 and a user profile 219 based on the identity of the user 203. The content recommendation application may analyze the user profiles 218 and 219 to determine if either of the users 202 and 203 has a disability. For example, as shown, the user profile 218 may indicate that the user 202 does not have a disability 220 ("None"), while the user profile 219 may indicate that the user 203 has a visual impairment 221 ("80% visual impairment").

In response to retrieving the user profiles 218 and 219 of the users 202 and 203 and determining that the use 202 does not have a disability and that user 203 has an "80% visual impairment," the media content application may identify media content items to recommend to the users 202 and 203 based on the retrieved user profiles 218 and 219 and the type of the disability 221. For example, as shown, a GUI 222 may be generated for presentation to the users 202 and 203, including identifiers 224 and 225 for identified media content items ("GoodFellas" and "Twelve Angry Men"). As shown, "GoodFellas" may have an average visual impairment favorability factor 226 ("71%"), and "Twelve Angry Men" may have a high visual impairment favorability factor 227 ("94%"). In some embodiments, when the content recommendation application identifies multiple users, at least one of whom does not have a disability, the content recommendation application may recommend some media content items with a high favorability factor and some media content items with a lower favorability factor. In some embodiments, it may be advantageous to recommend only media content items with a minimum favorability factor so that all of the users in the vicinity of the user equipment 204 may comprehend and enjoy the media content items. Although the visual impairment favorability factors 226 and 227 are included in the GUI 222, this is only an example, and the visual impairment favorability factors 226 and 227 may be output by a speaker of the user equipment 204 (e.g., if the user 203 is using an accessibility mode such as a screen reader).

Although only a visual impairment and a hearing impairment are discussed above, it should be understood that the systems and processes described herein may be applied to other types of disabilities that may affect the ability of a user to comprehend certain types of content. As one example, if a user has a learning disability, the content recommendation application may recommend media content items that are easy for a user with a learning disability to understand. As another example, if a user is prone to seizures, the content recommendation application may recommend media content items that are unlikely to cause a seizure (e.g., media content items that do not include quickly changing scenes or quickly changing brightness).

FIG. 3 shows an illustrative table 300 of favorability factors for a plurality of media content items, in accordance with some embodiments of the present disclosure. As shown, the table 300 includes three media content items (e.g., corresponding to the identifiers 124, 224, and 225 of FIGS. 1 and 2). For each of the media content items, the content recommendation application may determine a total duration of scenes 302, a duration of scenes with a vocal output (e.g., dialogue) greater than a threshold 304, and a duration of scenes easily capturable in subtitles 306. As shown, based on these variables 302, 304, and 306, the content recommendation application may determine a visual impairment favorability factor ("$F_V$") 308 and a hearing impairment favorability factor ("$F_H$") 310 for each of the media content items.

In some embodiments, to determine the variables 302, 304, and 306 for each of the media content items, the content recommendation application may retrieve metadata associated with each media content item. The metadata may include metadata specific to each scene (e.g., segment) of a media content item, such as the identification of the scene, the length of the scene, the visual and audio content of the scene, etc. However, this is only an example, and the content recommendation application may also perform image and audio processing to generate metadata for each of the media content items. In some embodiments, the content recommendation application may analyze the metadata for each of the media content items to identify portions of the media content items that do not correspond to the storyline of the media content items (e.g., the credits) and exclude these portions from the calculations of the variables 302, 304, 306. For example, as shown, the content recommendation application may determine the total duration of scenes 302 of "Transformers," which has a listed runtime of 144 minutes, as 130 minutes. Similarly, the content recommendation may determine the total duration of scenes 302 of "GoodFellas" and "Twelve Angry Men" as 140 minutes and 90 minutes, respectively.

In some embodiments, the content recommendation application may analyze the metadata of each scene of the media content item to determine the duration of scenes with vocal output greater than a threshold (e.g., the variable 304). For example, for each scene, the content recommendation application may determine the number of words in the scene and the length of the scene and calculate the words per minute for the scene. The content recommendation application may compare the words per minute for the scene with a threshold value (e.g., five words a minute) to determine if the scene should be counted as a scene with vocal output (e.g., to exclude scenes with negligible vocal output). For example, as shown, the content recommendation application may determine the duration of scenes with vocal output greater than a threshold (e.g., the variable 304) of "Transformers," "GoodFellas," and "Twelve Angry Men" as 80 minutes, 120 minutes, and 85 minutes, respectively. In some embodiments, the threshold value may be adjusted by the user or adjusted based on the severity of the user disability. However, this is only an example, and the duration of vocal output with respect to a duration of the media content may be determined based on a duration of all of the verbal outputs in a media content item and the duration of the media content item (e.g., the variable 302) in order to determine a rate of words per minute or other unit of time for the media asset.

In some embodiments, the content recommendation application may analyze the metadata of each scene of the media content item to determine the duration of scenes easily capturable by subtitles (e.g., variable 306). For example, for each scene, the content recommendation application may determine if the vocal output exceeds a certain threshold words per minute (e.g., eighty) or if the vocal output switches between more than a threshold number of speaking characters per minute (e.g., six characters). In some embodiments, these thresholds may be adjusted by the user or adjusted based on the severity of the user disability or a reading ability of the user. In some embodiments, the content recommendation application may use a combination of the words per minute and the number of speaking characters per minute to determine if the scene is easily capturable by subtitles. In some embodiments, if the scene includes descriptions that are displayed as subtitles, the content recommendation application may adjust (e.g., lower) the threshold words per minute or threshold number of speaking characters based on the descriptions. In some embodiments, the content recommendation application may determine that a scene is easily capturable by subtitles if the total number of words to be displayed via subtitles (e.g., corresponding to characters, descriptions, and spoken words) is less than a threshold number of words per minute (e.g., sixty-five). Based on the duration of all the scenes that are determined to be easily capturable in subtitles, the content recommendation application may determine the variable 306. For example, as shown, the content recommendation application may determine the duration of scenes easily capturable in subtitles (e.g., the variable 306) of "Transformers," "GoodFellas," and "Twelve Angry Men" as 120 minutes, 100 minutes, and 30 minutes, respectively.

Based on the determined variables 302, 304, and 306 for each of the media content items, the content recommendation application may determine a visual impairment favorability factor ("$F_V$") 308 and a hearing impairment favorability factor ("$F_H$") 310 for each of the media content items. The visual impairment favorability factor 308 of a media content item corresponds to an estimated ability of a user with a hearing impairment to comprehend that media content item. For example, it may be difficult for a user with a visual impairment (e.g., the user 102 of FIG. 1) to comprehend media content that has very negligible vocal output (e.g., scenes with non-verbal communication, emotional scenes, fights, etc.). The content recommendation application may calculate the visual impairment favorability factor 308 by dividing the variable 304 by the variable 302. Similarly, the hearing impairment favorability factor 310 of a media content item corresponds to an estimated ability of a user with a visual impairment to comprehend that media content item. For example, it may be difficult for a user with a hearing impairment (e.g., the user 203 of FIG. 2) to comprehend media content that has very quick vocal outputs or dialogues (e.g., scenes with many characters speaking, characters speaking very quickly, etc.). The content recommendation application may calculate the hearing impairment favorability factor 310 by dividing the variable 306 by the variable 302. A high favorability factor for a disability means that a user with that disability will have a high likelihood of comprehending the corresponding media content item.

For example, as shown, the content recommendation application may determine that "Transformers" has a visual impairment favorability factor 308 of "62% and a hearing impairment favorability factor 310 of "92%" (e.g., "Transformers," which consists mostly of fight scenes and explosions without much verbal content, is an excellent candidate for a user with a hearing impairment, but not a good candidate for a user with a visual impairment). Similarly, as shown, the content recommendation application may determine that "GoodFellas" has a visual impairment favorability factor 308 of "86%" and a hearing impairment favorability factor 310 of "71%" (e.g., "GoodFellas, which consists of a mix of verbal content and scenes that are easily capturable by subtitles, is a good candidate for a user with a visual impairment and an acceptable candidate for a user with a hearing impairment). Also, as shown, the content recommendation application may determine that "Twelve Angry Men" has a visual impairment favorability factor 308 of "94%" and a hearing impairment favorability factor 310 of "33%" (e.g., "Twelve Angry Men," which consists mostly of verbal content in a jury room, is an excellent candidate for a user with a visual impairment, but not a good candidate for a user with a hearing impairment). In some embodiments, a hearing impairment favorability factor may be adjusted based on the availability of modified audio streams for a media content item. For example, if a media content item has modified audio streams that are easier for a user with a hearing impairment to understand (e.g., reduced background noise, increased verbal content levels relative to other volume levels, optimized for different types of hearing prostheses such as a cochlear implant, a bone conduction device, a middle ear implant, a brain stem implant, etc.), the determined hearing impairment favorability factor may be increased.

Although only three media content items are discussed with reference to FIG. 3, it should be understood that a visual impairment favorability factor and a hearing impairment favorability factor may be calculated for each media asset recommendation candidate. In some embodiments, it may be advantageous to determine favorability factors of media content items in advance of determining any recommendations and accessing the favorability factors from a database when recommending media content items.

Figure 4:
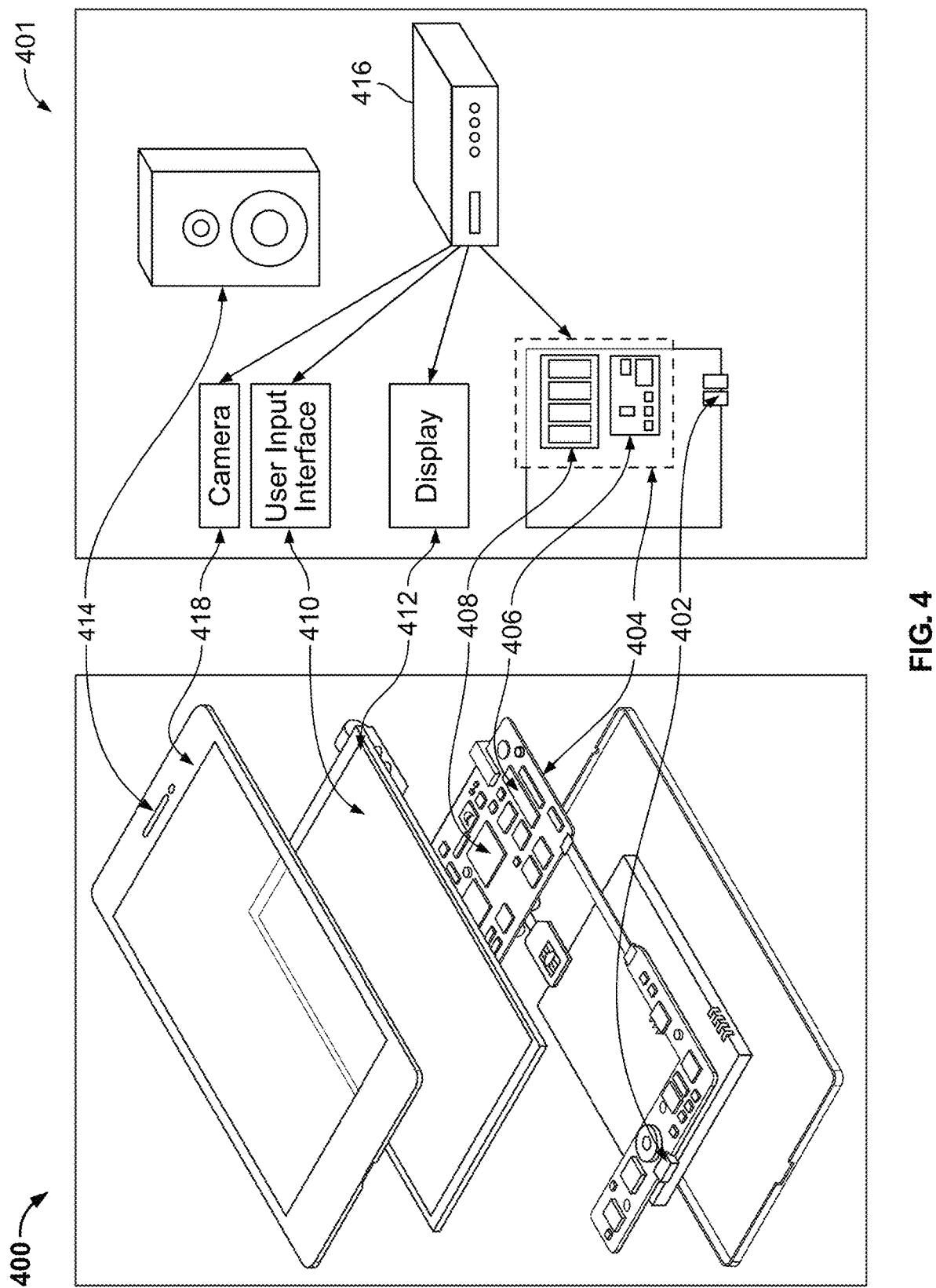
FIGS. 4-5 describe exemplary devices, systems, servers, and related hardware for identifying disabilities of users and recommending media content to the users based on the identified disabilities, in accordance with some embodiments of the present disclosure.
Figure 5:
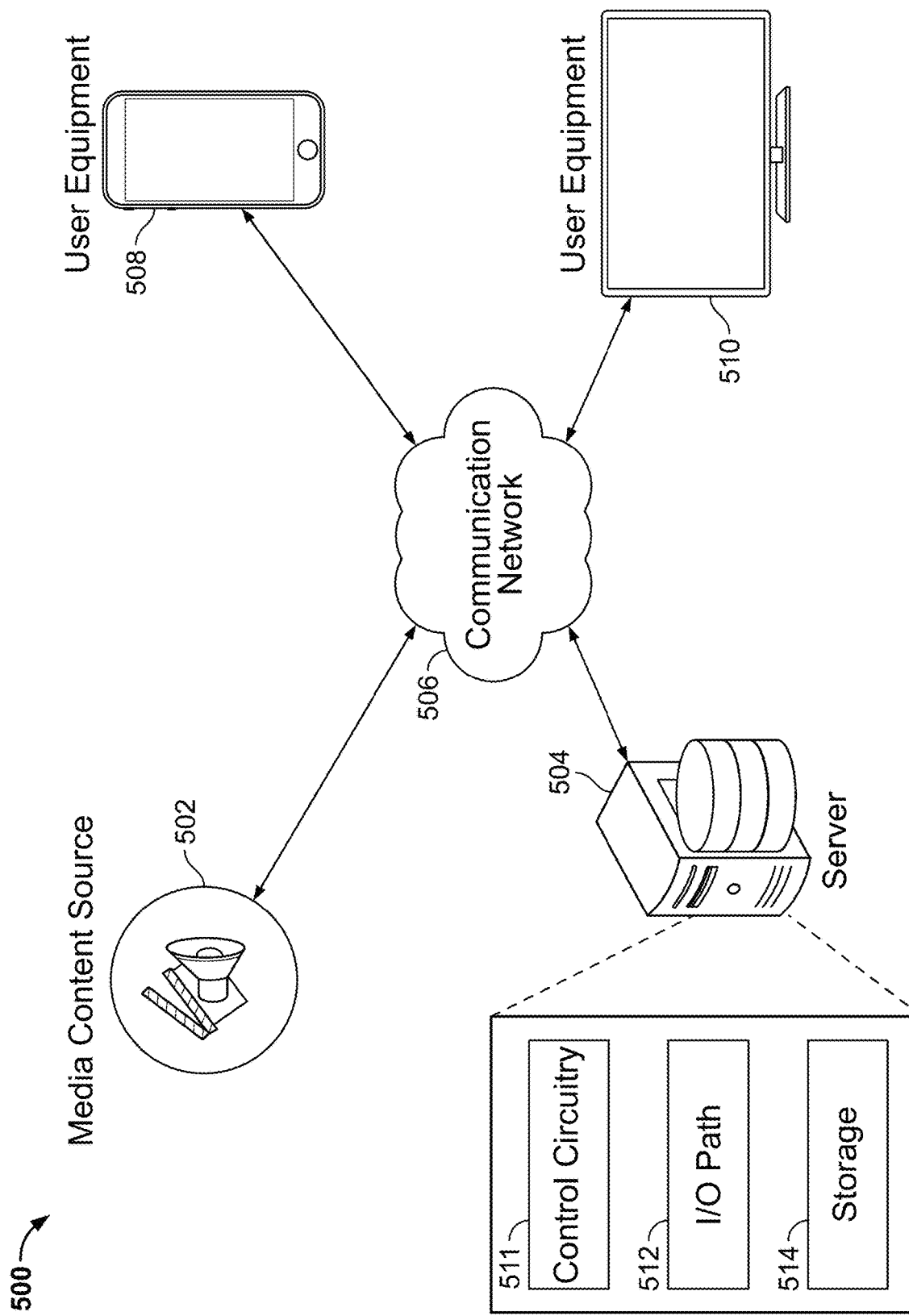

FIGS. 4-5 describe exemplary devices, systems, servers, and related hardware for identifying disabilities of users and recommending media content to the users based on the identified disabilities, in accordance with some embodiments of the present disclosure. FIG. 4 shows generalized embodiments of illustrative user equipment devices 400 and 401. For example, user equipment device 400 may be a tablet or smartphone device. In another example, user equipment system 401 may be a user television equipment system (e.g., the user equipment 104 or 204). In another example, the user equipment system 401 may be a stereo or other audio playback device. The user television equipment system 401 may include a set-top box 416. The set-top box 416 may be communicatively connected to a camera 418, a speaker 414, and a display 412. In some embodiments, the camera may detect users viewing the display. In some embodiments, the display 412 may be a television display or a computer display. In some embodiments, the set-top box 416 may be communicatively connected to a user input interface 410. In some embodiments, the user input interface 410 may be a remote control device. The set-top box 416 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 5. Each one of the user equipment device 400 and the user equipment system 401 may receive content and data via input/output (I/O) path 402. The I/O path 402 may provide content (e.g., broadcast programming, on-demand programming, Internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths (described below). I/O functions may be provided by one or more of these communications paths, but are shown as a single path in FIG. 4 to avoid overcomplicating the drawing.

The control circuitry 404 may be based on any suitable processing circuitry such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 404 executes instructions for a media guidance application stored in memory (i.e., the storage 408). Specifically, the control circuitry 404 may be instructed by the media guidance application to perform the functions discussed above and below. In some implementations, any action performed by the control circuitry 404 may be based on instructions received from the media guidance application.

In client/server-based embodiments, the control circuitry 404 may include communications circuitry suitable for communicating with a media guidance application server or other networks or servers. The instructions for carrying out the above-mentioned functionality may be stored on a server (which is described in more detail in connection with FIG. 5). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video recorders (DVRs, sometimes called personal video recorders, or PVRs), solid state devices, quantum storage devices, gaming consoles, gaming media, or any other suitable fixed or removable storage devices, and/or any combination of the same. The storage 408 may be used to store various types of content described herein as well as media guidance application data described above. For example, the storage 408 may be used to store the calendar data described in FIG. 2. In some embodiments, the calendar data may be stored in association with a user profile. Nonvolatile memory may also be used (e.g., to launch a boot-up routine and other instructions). Cloud-based storage, described in relation to FIG. 5, may be used to supplement the storage 408 or instead of the storage 408.

The control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. The control circuitry 404 may also include scaler circuitry for upconverting and downconverting content into the preferred output format of the user equipment 400. The circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If the storage 408 is provided as a separate device from the user equipment device 400, the tuning and encoding circuitry (including multiple tuners) may be associated with the storage 408.

A user may send instructions to the control circuitry 404 using the user input interface 410. The user input interface 410 may be any suitable user interface, such as a remote control, mouse, trackball, keypad, keyboard, touchscreen, touchpad, stylus input, joystick, voice recognition interface, or other user input interfaces. The display 412 may be provided as a stand-alone device or integrated with other elements of each one of the user equipment device 400 and the user equipment system 401. For example, the display 412 may be a touchscreen or touch-sensitive display. In such circumstances, the user input interface 410 may be integrated with or combined with display 412. The display 412 may be one or more of a monitor, a television, a display for a mobile device, or any other type of display. A video card or graphics card may generate the output to the display 412. The video card may be any processing circuitry described above in relation to the control circuitry 404. The video card may be integrated with the control circuitry 404. Speakers 414 may be provided as integrated with other elements of each one of the user equipment device 400 and the user equipment system 401 or may be stand-alone units. The audio component of videos and other content displayed on the display 412 may be played through the speakers 414. In some embodiments, the audio may be distributed to a receiver (not shown), which processes and outputs the audio via speakers 414.

The media guidance application may be implemented using any suitable architecture. For example, it may be a stand-alone application wholly implemented on each one of the user equipment device 400 and the user equipment system 401. In such an approach, instructions of the application are stored locally (e.g., in the storage 408), and data for use by the application is downloaded on a periodic basis (e.g., from an out-of-band feed, from an Internet resource, or using another suitable approach). The control circuitry 404 may retrieve instructions of the application from the storage 408 and process the instructions to recommend media content items as discussed. Based on the processed instructions, the control circuitry 404 may determine what action to perform when input is received from the user input interface 410. For example, movement of a cursor on a display up/down may be indicated by the processed instructions when the user input interface 410 indicates that an up/down button was selected.

In some embodiments, the media guidance application is a client/server-based application. Data for use by a thick or thin client implemented on each one of the user equipment device 400 and the user equipment system 401 is retrieved on demand by issuing requests to a server remote to each one of the user equipment device 400 and the user equipment system 401. In one example of a client/server-based guidance application, the control circuitry 404 runs a web browser that interprets web pages provided by a remote server. For example, the remote server may store the instructions for the application in a storage device. The remote server may process the stored instructions using circuitry (e.g., the control circuitry 404) and identify user disabilities and recommend media content items based on the type of disabilities as discussed.

In some embodiments, the media guidance application is downloaded and interpreted or otherwise run by an interpreter or virtual machine (run by the control circuitry 404). In some embodiments, the media guidance application may be encoded in the ETV Binary Interchange Format (EBIF), received by the control circuitry 404 as part of a suitable feed, and interpreted by a user agent running on the control circuitry 404. For example, the media guidance application may be an EBIF application. In some embodiments, the media guidance application may be defined by a series of JAVA-based files that are received and run by a local virtual machine or other suitable middleware executed by control circuitry 404. In some of such embodiments (e.g., those employing MPEG-2 or other digital media encoding schemes), the media guidance application may be, for example, encoded and transmitted in an MPEG-2 object carousel with the MPEG audio and video packets of a program.

FIG. 5 is a diagram of an illustrative media system, in accordance with some embodiments of the disclosure. User equipment devices 508 and 510 (such as the user equipment 104 or 204) may be coupled to communication network 506. The communication network 506 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths such as short-range communication paths, point-to-point communications paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via the communication network 506.

The system 500 includes a media content source 502 and a server 504. Communications with the media content source 502 and the server 504 may be exchanged over one or more communications paths but are shown as a single path in FIG. 5 to avoid overcomplicating the drawing. In addition, there may be more than one of each of the media content source 502 and the server 504, but only one of each is shown in FIG. 5 to avoid overcomplicating the drawing. If desired, the media content source 502 and the server 504 may be integrated as one source device.

In some embodiments, the server 504 may include control circuitry 511 and a storage 514 (e.g., RAM, ROM, hard disk, removable disk, etc.). The server 504 may also include an input/output path 512. The I/O path 512 may provide device information, or other data, over a local area network (LAN) or wide area network (WAN), and/or other content and data to the control circuitry 511, which includes processing circuitry, and the storage 514. The control circuitry 511 may be used to send and receive commands, requests, and other suitable data using the I/O path 512. The I/O path 512 may connect the control circuitry 511 (and specifically processing circuitry) to one or more communications paths.

The control circuitry 511 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 511 executes instructions for an emulation system application stored in memory (e.g., the storage 514). Memory may be an electronic storage device provided as the storage 514 that is part of the control circuitry 511.

The server 504 may retrieve guidance data from media content source 502, process the data as will be described in detail below, and forward the data to the user equipment devices 508 and 510. The media content source 502 may include one or more types of content distribution equipment including an audio distribution facility, a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Web cast provider, etc.) or may not be the originator of content (e.g., an on-demand content provider, an Internet provider of content of broadcast programs for downloading, etc.). The media content source 502 may include cable sources, satellite providers, on-demand providers, Internet providers, over-the-top content providers, or other providers of content. The media content source 502 may also include a remote media server used to store different types of content (including video content selected by a user), in a location remote from any of the client devices.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 504), which may be located centrally or at distributed locations, that provide cloud-based services to various types of users and devices connected via a network (such as the Internet) via communication network 506. In such embodiments, user equipment devices may operate in a peer-to-peer manner without communicating with a central server.

Figure 6:
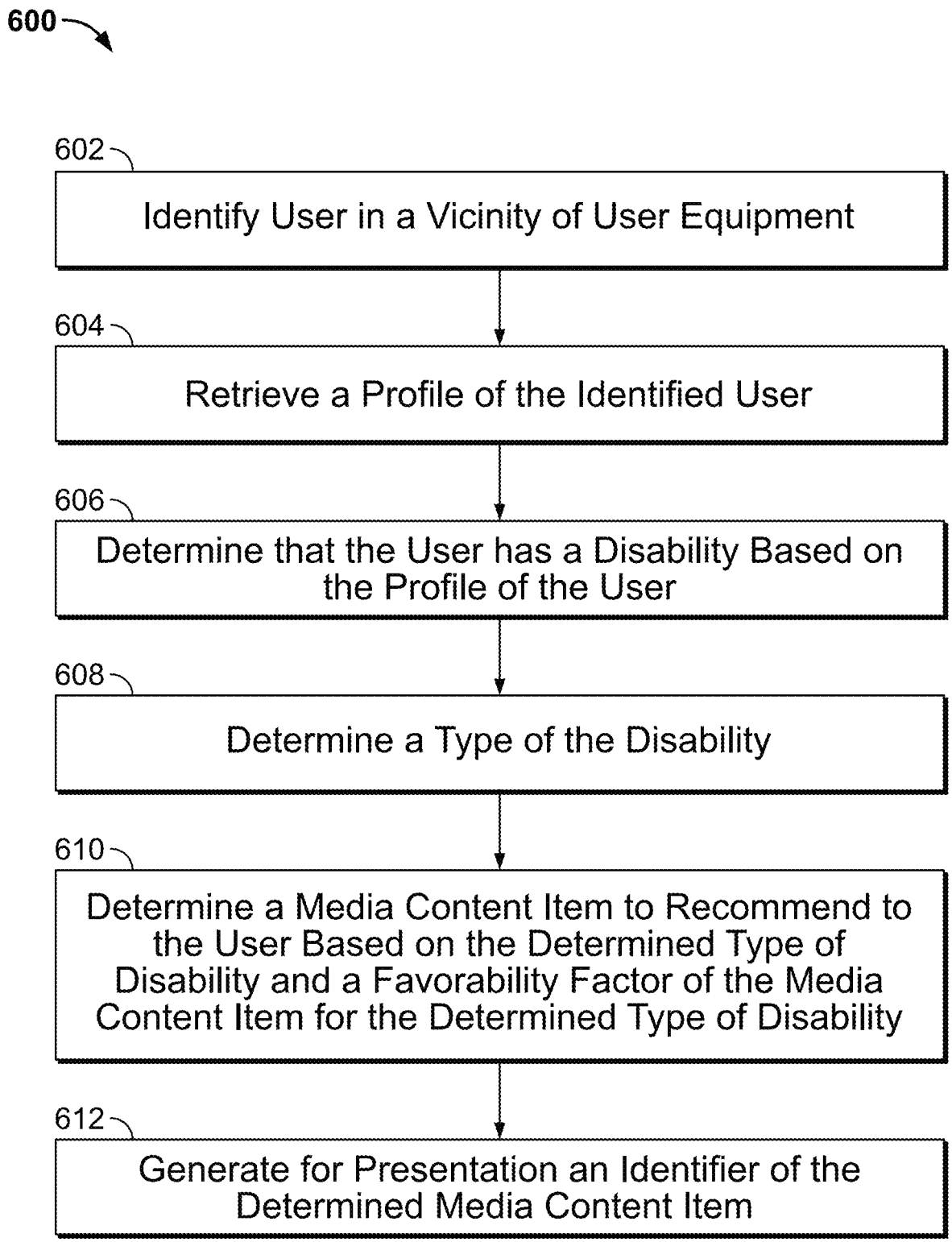
FIG. 6 depicts a flowchart of illustrative steps for identifying disabilities of users and recommending media content to the users based on the identified disabilities, in accordance with some embodiments of the present disclosure.

FIG. 6 depicts a flowchart of illustrative steps for identifying disabilities of users and recommending media content to the users based on the identified disabilities, in accordance with some embodiments of the present disclosure. The process 600 may be executed by the control circuitry 404 (e.g., in a manner instructed to the control circuitry 404 by the content recommendation application). The control circuitry 404 may be part of user equipment (e.g., a device that may have any or all of the functionality of the user equipment devices 508 or 510), or of a remote server separated from the user equipment by way of the communication network 506, or distributed over a combination of both. It should be noted that the process 600, or any step thereof, could be performed on, or provided by, any of the devices shown in FIGS. 1, 2, 4, and 5.

The process 600 begins at step 602 when the content recommendation application (e.g., via control circuitry 404) may identify users (e.g., user 102 of FIG. 1 or users 202 and 203 of FIG. 2) in the vicinity of user equipment (e.g., user equipment 104 of FIG. 1 or user equipment 204 of FIG. 2). In some embodiments, facial recognition techniques may be used to identify the user. For example, an image (e.g., image 112 of FIG. 1 or images 212 and 213 of FIG. 2) of a user may be captured by way of a sensor (e.g., sensor 106 of FIG. 1 or sensor 206 of FIG. 2), and image processing and facial recognition techniques may be used to identify the user (e.g., by comparing extracted facial characteristics to facial characteristics of users in a database (e.g., biometrics database 114 of FIG. 1 or biometrics database 214 of FIG. 2). In some embodiments, a user may be identified by a profile currently logged into the user equipment or by information obtained from a device associated with the user. In some embodiments, the user may be identified using voice recognition techniques.

At 604, the content recommendation application (e.g., via control circuitry 404) may query a database (e.g., user profiles database 116 of FIG. 1 or user profiles database 216 of FIG. 2) based on the identity of the user to obtain a profile (e.g., user profile 118 of FIG. 1 or user profiles 218 and 219 of FIG. 2) associated with the identified user.

At 606, the content recommendation application (e.g., via control circuitry 404) may determine that the user has a disability (e.g., hearing impairment 120 of FIG. 1 or a visual impairment 221 of FIG. 2) based on the profile of the user. For example, the disability, the type of disability, and the severity of the disability may be stored in the profile of the user.

At 608, the content recommendation application (e.g., via control circuitry 404) may determine the type of the identified disability of the user (e.g., the hearing impairment 120 of FIG. 1 or the visual impairment 221 of FIG. 2). In some embodiments, the control circuitry 404 may also determine the severity of the type of disability (e.g., 50% hearing impairment), as explained in greater detail in FIG. 7.

At 610, the content recommendation application (e.g., via control circuitry 404) may determine a media content item to recommend to the user based on the determined type of disability and a favorability factor of the media content item for the determined type of disability. For example, as explained in greater detail in FIGS. 7 and 8, the control circuitry 404 may select, as a media content item to recommend, a media content item that a user with the identified disability will be able to easily comprehend. For example, if the user has a hearing impairment, the control circuitry 404 may recommend a media content item that can easily be captured in subtitles (e.g., "Transformers" of FIG. 1). If the user has a visual impairment, the control circuitry 404 may recommend a media content item with a large among of vocal content (e.g., "Twelve Angry Men" of FIG. 2).

At 612, the content recommendation application (e.g., via control circuitry 404) may generate for presentation a GUI (e.g., GUI 122 of FIG. 1 or GUI 222 of FIG. 2) including identifiers of each recommended media content item (e.g., respective identifiers 124, 224, and 225 of FIGS. 1 and 2).

Figure 7:
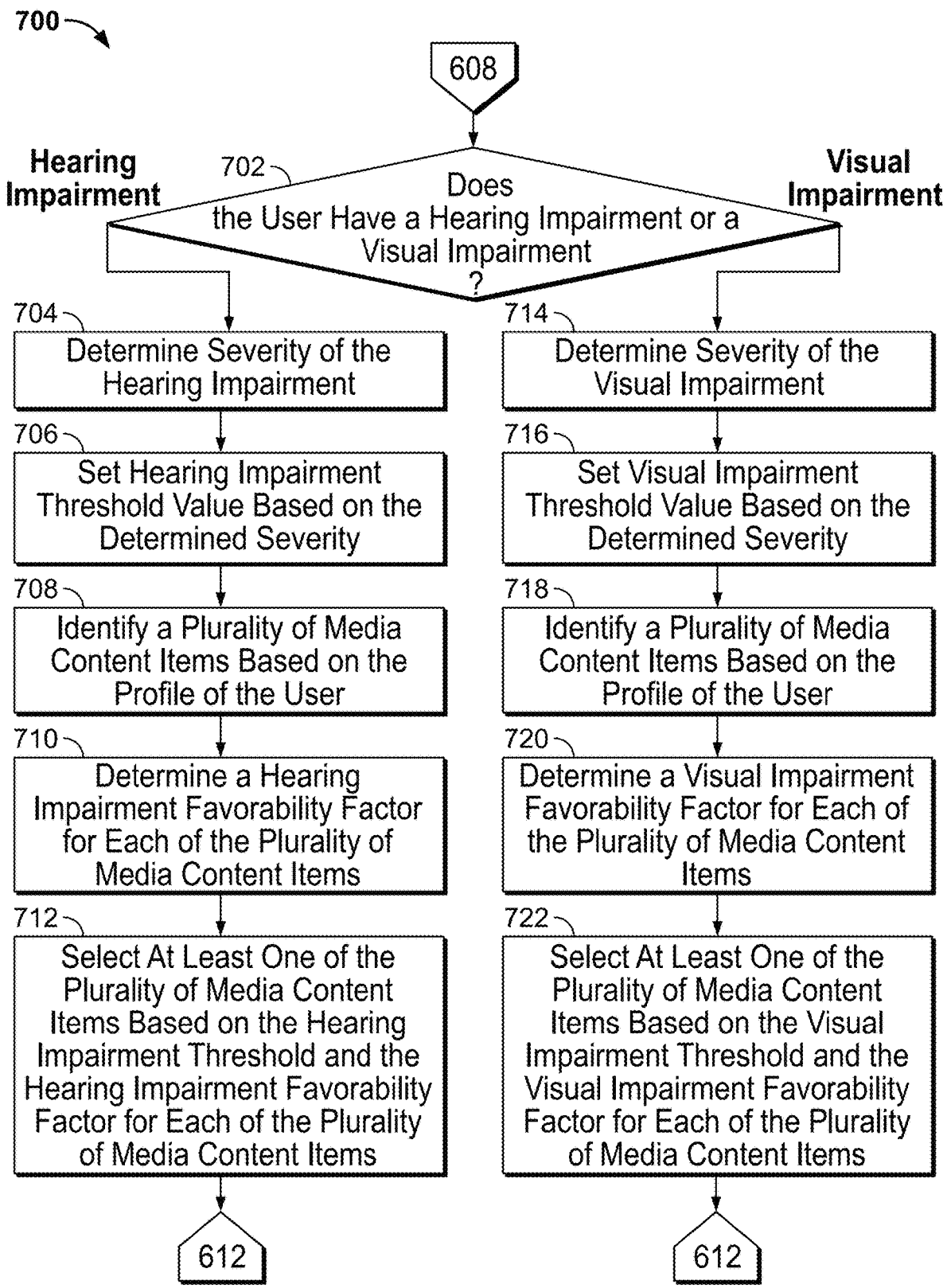
FIG. 7 depicts a flowchart of illustrative steps for determining a content item to recommend to the user, in accordance with some embodiments of the present disclosure.

FIG. 7 depicts a flowchart of illustrative steps for determining a content item to recommend to the user, in accordance with some embodiments of the present disclosure. Process 700 is one embodiment of a method for performing steps 608 and 610 of FIG. 6 and begins after step 606. At step 702, the content recommendation application (e.g., via the control circuitry 404) may determine if the user has a hearing impairment or a visual impairment. For example, the control circuitry 404 retrieves the type of sensory impairment from the profile of the user. In response to determining that the user has a hearing impairment, the process 700 proceeds to step 704. Otherwise, in response to determining that the user has a visual impairment, the process 700 proceeds to step 714.

At 704, the content recommendation application (e.g., via control circuitry 404) may determine the severity of the hearing impairment by retrieving the severity of the hearing impairment from the profile (e.g., user profile 118 of FIG. 1) of the user. In some embodiments, the control circuitry may determine the severity of the hearing impairment by administering a hearing test to the user (e.g., through the user equipment 104).

At 706, the content recommendation application (e.g., via control circuitry 404) may set a hearing impairment threshold value based on the determined severity. For example, if the user has severe hearing loss, the hearing impairment threshold value may be set to a high threshold so that only media content items with a high hearing impairment favorability factor may be recommended to the user (e.g., as explained in further detail in step 712).

At 708, the content recommendation application (e.g., via control circuitry 404) may identify a plurality of media content items based on the profile of the user. For example, the control circuitry 404 may identify media content items likely to be of interest to the user (e.g., based on various interests of the user, viewing history of the user, prior search queries of the user, prior interactions with media assets by the user, social media interactions by the user related to media assets, etc.). If multiple users are identified (e.g., users 202 and 203 of FIG. 2), the media content items may be identified based on profiles of both of the users (e.g., shared interests).

At 710, the content recommendation application (e.g., via control circuitry 404) may determine a hearing impairment favorability factor for each of the plurality of media content items, as explained in greater detail with reference to FIG. 8A. The hearing impairment favorability factor of a media content item corresponds to an estimated ability of a user with a hearing impairment to comprehend that media content item.

At 712, the content recommendation application (e.g., via control circuitry 404) may select at least one of the plurality of media content items based on the hearing impairment threshold and the hearing impairment favorability factor for each of the plurality of media content items. For example, in some embodiments, the control circuitry 404 may select the media asset with the highest hearing impairment favorability factor. In some embodiments, if multiple media assets have a hearing impairment favorability factor that exceeds the hearing impairment threshold, the control circuitry 404 may select the media content item (or multiple content items), based on a popularity value, a ranking corresponding to the profile of the user, profiles of other users in the vicinity of the user equipment, etc.

At 714, the content recommendation application (e.g., via control circuitry 404) may determine the severity of the visual impairment by retrieving the severity of the visual impairment from the profile (e.g., user profile 219 of FIG. 2) of the user. In some embodiments, the control circuitry may determine the severity of the visual impairment by administering a vision test to the user (e.g., through the user equipment 204).

At 716, the content recommendation application (e.g., via control circuitry 404) may set a visual impairment threshold value based on the determined severity. For example, if the user has severe vision loss, the visual impairment threshold value may be set to a high threshold so that only media content items with a high visual impairment favorability factor may be recommended to the user (e.g., as explained in further detail in step 722).

At 718, the content recommendation application (e.g., via control circuitry 404) may identify a plurality of media content items based on the profile of the user, as described in step 708.

At 720, the content recommendation application (e.g., via control circuitry 404) may determine a visual impairment favorability factor for each of the plurality of media content items, as explained in greater detail with reference to FIG. 8B. The visual impairment favorability factor of a media content item corresponds to an estimated ability of a user with a visual impairment to comprehend that media content item.

At 722, the content recommendation application (e.g., via control circuitry 404) may select at least one of the plurality of media content items based on the visual impairment threshold and the visual impairment favorability factor for each of the plurality of media content items. For example, in some embodiments, the control circuitry 404 may select the media asset with the highest visual impairment favorability factor. In some embodiments, if multiple media assets have a visual impairment favorability factor that exceeds the visual impairment threshold, the control circuitry 404 may select the media content item (or multiple content items), based on a popularity value, a ranking corresponding to the profile of the user, profiles of other users in the vicinity of the user equipment, etc.

Figure 8A:
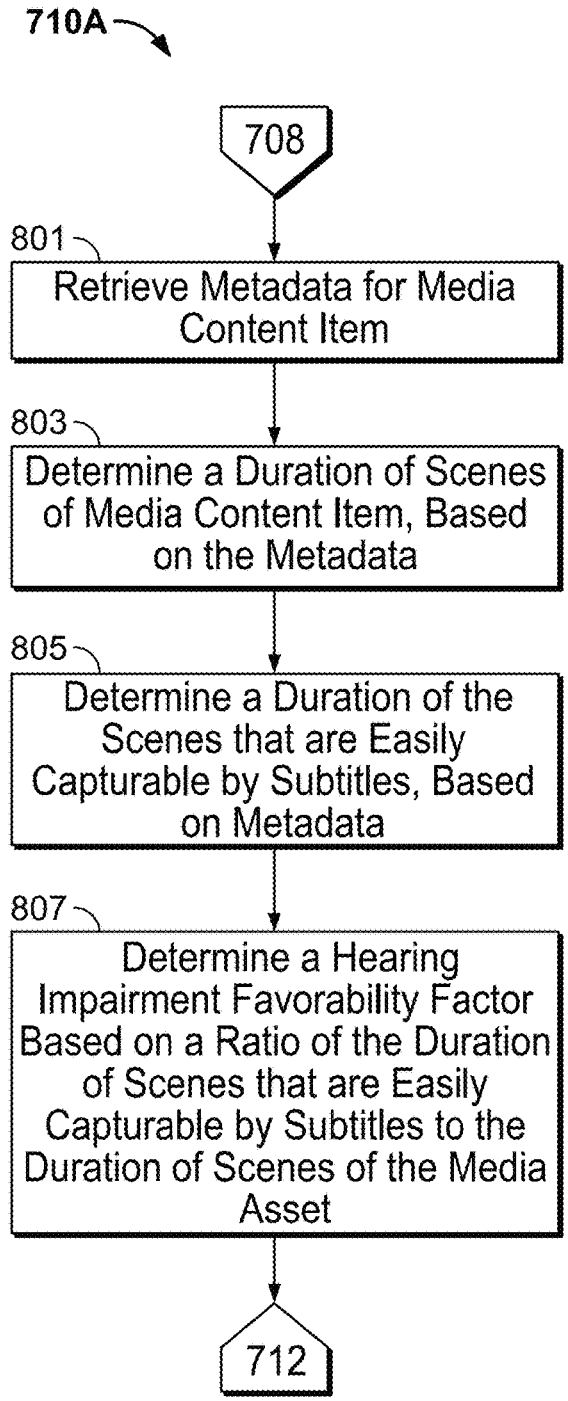
FIG. 8A depicts a flowchart of illustrative steps for determining hearing impairment favorability factors of media content items, in accordance with some embodiments of the present disclosure.

FIG. 8A depicts a flowchart of illustrative steps for determining hearing impairment favorability factors of media content items, in accordance with some embodiments of the present disclosure. Process 710A is one embodiment of a method for performing step 710 of FIG. 7 and begins after step 708. The process 710A may be repeated for each of the plurality of media content items identified in step 708. In some embodiments, the process 710A may be performed in advance for each media content item in a library of content items accessible to the user and stored in a database. At step 801, the content recommendation application (e.g., via the control circuitry 404) may retrieve metadata for a media content item (e.g., a first one of the plurality of identified media content items). In some embodiments, the metadata for a media content item may be stored in association with the media content item. In some embodiments, the metadata may be retrieved from a media content item metadata database.

At 803, the content recommendation application (e.g., via control circuitry 404) may determine the duration of scenes of the media content item based on the metadata. In some embodiments, the control circuitry 404 may exclude certain portions of the media content item (e.g., the credits) from the duration, based on the metadata.

At 805, the content recommendation application (e.g., via control circuitry 404) may determine the duration of the scenes that are easily capturable by subtitles based on the metadata. For example, if the words per minute to be displayed via subtitles (e.g., corresponding to characters, descriptions, and spoken words) does not exceed a threshold number of words per minute (e.g., sixty-five), the control circuitry 404 may determine that the scene is easily capturable by subtitles. In some embodiments, the threshold number of words per minute may be adjusted based on the user (e.g., a reading rate of the user).

At 807, the content recommendation application (e.g., via control circuitry 404) may determine a hearing impairment favorability factor based on a ratio of the duration of the scenes that are easily capturable by subtitles to the duration of scenes of the media asset. For example, as shown in FIG. 3, the control circuitry 404 may determine the hearing impairment favorability factor of "Transformers" as "92%" (e.g., $F_H$=duration of scenes easily capturable by subtitles/duration of scenes).

Figure 8B:
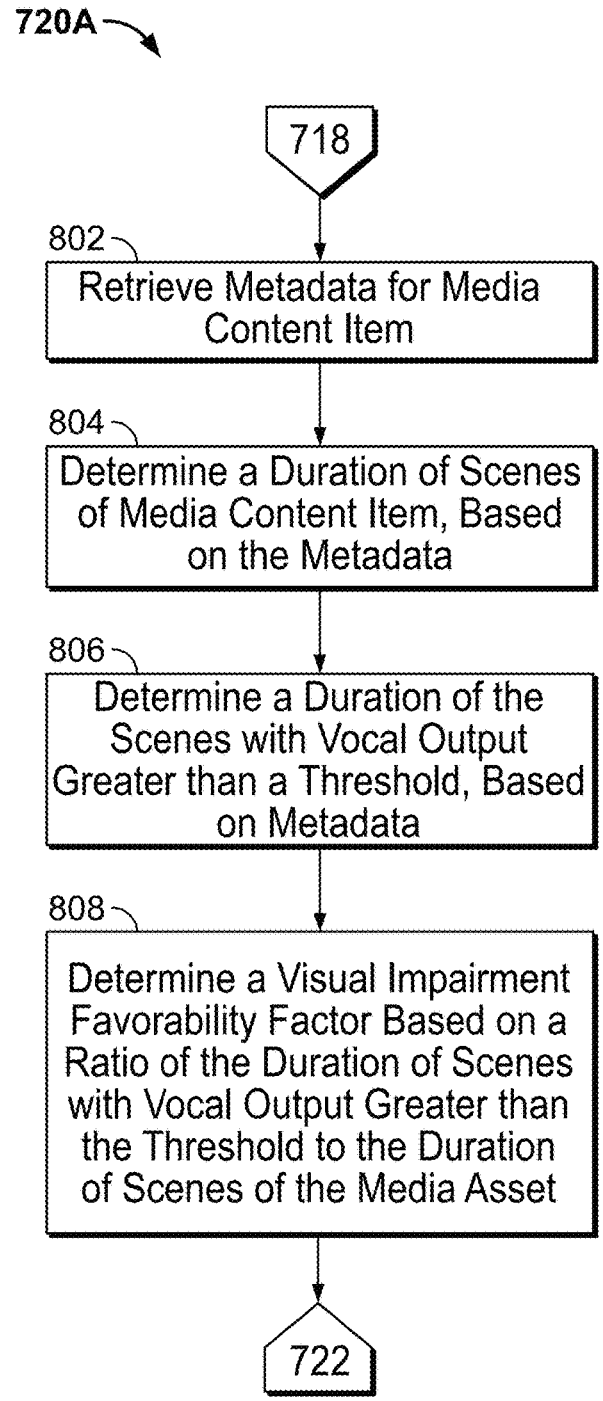
FIG. 8B depicts a flowchart of illustrative steps for determining visual impairment favorability factors of media content items, in accordance with some embodiments of the present disclosure.

FIG. 8B depicts a flowchart of illustrative steps for determining visual impairment favorability factors of media content items, in accordance with some embodiments of the present disclosure. Process 720A is one embodiment of a method for performing step 720 of FIG. 7 and begins after step 718. The process 720A may be repeated for each of the plurality of media content items identified in step 718. In some embodiments, the process 720A may be performed for each media content item in a library of content items accessible to the user. At step 802, the content recommendation application (e.g., via the control circuitry 404), retrieves metadata for a media content item (e.g., a first one of the plurality of identified media content items). In some embodiments, the metadata for a media content item may be stored in association with the media content item. In some embodiments, the metadata may be retrieved from a media content item metadata database.

At 804, the content recommendation application (e.g., via control circuitry 404) may determine the duration of scenes of the media content item based on the metadata, as described in step 803.

At 806, the content recommendation application (e.g., via control circuitry 404) may determine the duration of the scenes with a vocal output greater than a threshold based on the metadata. For example, if a scene includes at least a certain number of words a minute (e.g., five words a minute), the control circuitry 404 may determine that the scene has a vocal output greater than a threshold (e.g., to exclude scenes with negligible vocal outputs that may not be easily understood by a user with a visual impairment).

At 808, the content recommendation application (e.g., via control circuitry 404) may determine a visual impairment favorability factor based on a ratio of the duration of the scenes with a vocal output greater than a threshold to the duration of scenes of the media asset. For example, as shown in FIG. 3, the control circuitry 404 may determine the visual impairment favorability factor of "Twelve Angry Men" as "94%" (e.g., $F_V$=duration of scenes with vocal output/duration of scenes).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, the plurality of media content items in step 708 may be identified based on the corresponding hearing impairment favorability factors and filtered based on the profile of the user. Similarly, the plurality of media content items in step 718 may be identified based on the corresponding visual impairment favorability factors and filtered based on the profile of the user. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of recommending media content to users with disabilities, the method comprising:
    determining that a user has a disability;
    in response to determining that the user has a disability, determining a type of the disability comprising hearing impairment;
    determining a media content item to recommend to the user, among a plurality of media content items, based on the determined type of disability comprising hearing impairment and a hearing impairment favorability factor of the media content item, wherein each hearing impairment favorability factor is based on a ratio of a duration of scenes of the media content item determined to be easily capturable in subtitles to a total duration of scenes of the media content item,
    wherein a scene determined to be easily capturable in subtitles does not comprise fast dialogue, several characters speaking, or a high rate of frame changes with corresponding dialogue; and
    generating for presentation an identifier of the determined media content item,
    wherein selection of the identifier causes presentation of the media content item including a modification optimized for the determined type of disability.

2. The method of claim 1, further comprising identifying the user in a vicinity of user equipment,
    wherein the generating for presentation comprises generating for presentation, on the user equipment, the identifier of the determined media content item.

3. The method of claim 1, wherein determining the type of the disability comprises:
    determining an identity of the user;
    retrieving, from a database of user profiles, a profile of the user based on the identity of the user; and
    determining the type of disability stored in the profile of the user.

4. The method of claim 1, further comprising determining a severity of the determined type of disability,
    wherein the determining the media content item to recommend to the user comprises:
        setting a threshold value based on the determined severity of the determined type of disability; and
        selecting a media content item that has a favorability factor for the determined type of disability that exceeds the threshold value as the media content item to recommend to the user.

5. The method of claim 1, wherein the determining the media content item to recommend to the user comprises selecting, from among the plurality of content items, a media content item having the highest favorability factor for the determined type of disability as the media content item to recommend to the user.

6. The method of claim 1, further comprising generating for presentation, with the identifier of the determined media content item, an indication of the favorability factor of the determined media content item for the determined type of disability.

7. The method of claim 1, further comprising receiving an input from the user indicating the type of disability and a severity of the type of disability,
    wherein the determining the media content item to recommend to the user is based on the severity of the type of disability.

8. The method of claim 1, wherein the user is a first user, wherein the method further comprises:
    determining identities of the first user and a second user in a vicinity of user equipment;
    retrieving, from a database of user profiles, a first profile of the first user based on the identity of the first user and a second profile of the second user based on the identity of the second user; and
    determining a subset of media content items of interest to the first user and second user, among the plurality of media content items, based on the first user profile and the second user profile, and
    wherein the determining the media content item to recommend to the user comprises selecting, from among the subset of content items, a media content item having the highest favorability factor for the determined type of disability as the media content item to recommend to the user.

9. A system of recommending media content to users with disabilities, the system comprising:
    a memory storing instructions; and
    processing circuitry configured to execute the instructions stored in the memory to:
    determine that a user has a disability;
    in response to determining that the user has a disability, determine a type of the disability comprising hearing impairment;
    determine a media content item to recommend to the user, among a plurality of media content items, based on the determined type of disability comprising hearing impairment and a hearing impairment favorability factor of the media content item, wherein each hearing impairment favorability factor is based on a ratio of a duration of scenes of the media content item determined to be easily capturable in subtitles to a total duration of scenes of the media content item, wherein a scene determined to be easily capturable in subtitles does not comprise fast dialogue, several characters speaking, or a high rate of frame changes with corresponding dialogue; and generate for presentation an identifier of the determined media content item, wherein selection of the identifier causes presentation of the media content item including a modification optimized for the determined type of disability.

10. The system of claim 9, wherein the processing circuitry is further configured to identify the user in a vicinity of user equipment, and wherein the control circuitry is further configured, when generating for presentation the identifier of the determined media content item, to generating for presentation, on the user equipment, the identifier of the determined media content item.

11. The system of claim 9, wherein the processing circuitry is further configured, when determining the type of the disability, to:

determine an identity of the user;

retrieve, from a database of user profiles, a profile of the user based on the identity of the user; and determine the type of disability stored in the profile of the user.

12. The system of claim 9, wherein the processing circuitry is further configured to determine a severity of the determined type of disability, and wherein the control circuitry is further configured, when determining the media content item to recommend to the user, to:

set a threshold value based on the determined severity of the determined type of disability; and select a media content item that has a favorability factor for the determined type of disability that exceeds the threshold value as the media content item to recommend to the user.

13. The system of claim 9, wherein the processing circuitry is further configured, when determining the media content item to recommend to the user, to select, from among the plurality of content items, a media content item having the highest favorability factor for the determined type of disability as the media content item to recommend to the user.

14. The system of claim 9, wherein the processing circuitry is further configured to generate for presentation, with the identifier of the determined media content item, an indication of the favorability factor of the determined media content item for the determined type of disability.

15. The system of claim 9, wherein the processing circuitry is further configured to receive an input from the user indicating the type of disability and a severity of the type of disability, and wherein the control circuitry is further configured, when determining the media content item to recommend to the user, to determine the media content item based on the severity of the type of disability.

16. The system of claim 9, wherein the user is a first user, wherein the processing circuitry is further configured to:

determine identities of the first user and a second user in a vicinity of user equipment;

retrieve, from a database of user profiles, a first profile of the first user based on the identity of the first user and a second profile of the second user based on the identity of the second user; and determine a subset of media content items of interest to the first user and second user, among the plurality of media content items, based on the first user profile and the second user profile, wherein the control circuitry is further configured, when determining the media content item to recommend to the user, to select, from among the subset of content items, a media content item having the highest favorability factor for the determined type of disability as the media content item to recommend to the user.

\* \* \* \* \*